United States Patent [19]

Rueb et al.

[11] Patent Number: 5,615,013
[45] Date of Patent: Mar. 25, 1997

[54] GALVANOMETER AND CAMERA SYSTEM

[75] Inventors: Kurt Rueb, Kitchener; Andrew Wong, Waterloo, both of Canada

[73] Assignee: Virtek Vision Corp., Waterloo, Canada

[21] Appl. No.: 495,190

[22] Filed: Jun. 27, 1995

[51] Int. Cl.$^6$ ................................................. G01B 11/00
[52] U.S. Cl. ........................ 356/394; 356/398; 356/376
[58] Field of Search ................................. 356/376, 431, 356/394, 398, 237, 375; 250/559.46, 559.45, 559.48, 559.49

[56] References Cited

U.S. PATENT DOCUMENTS 4,775,235  10/1988  Hecker et al. ........................ 356/376
5,459,794  10/1995  Ninomiya ................................. 382/8

Primary Examiner—Frank Gonzalez
Assistant Examiner—Amanda Merlino
Attorney, Agent, or Firm—Howard & Howard

[57] ABSTRACT

A system combines a galvanometer system with a camera to provide information from a workpiece to the camera. The galvanometer rotates mirrors to change the image that is directed from the workpiece into the camera. The inventive method allows the use of the camera to identify the location of points on the workpiece. Further, the system facilitates the use of the camera to store information about a pattern on a workpiece. Also, the system can be utilized to create a computer aided design file of the surface of a workpiece. The system is utilized in the last two methods to serially store bit by bit information about the workpiece in a memory.

19 Claims, 1 Drawing Sheet

U.S. Patent     Mar. 25, 1997     5,615,013
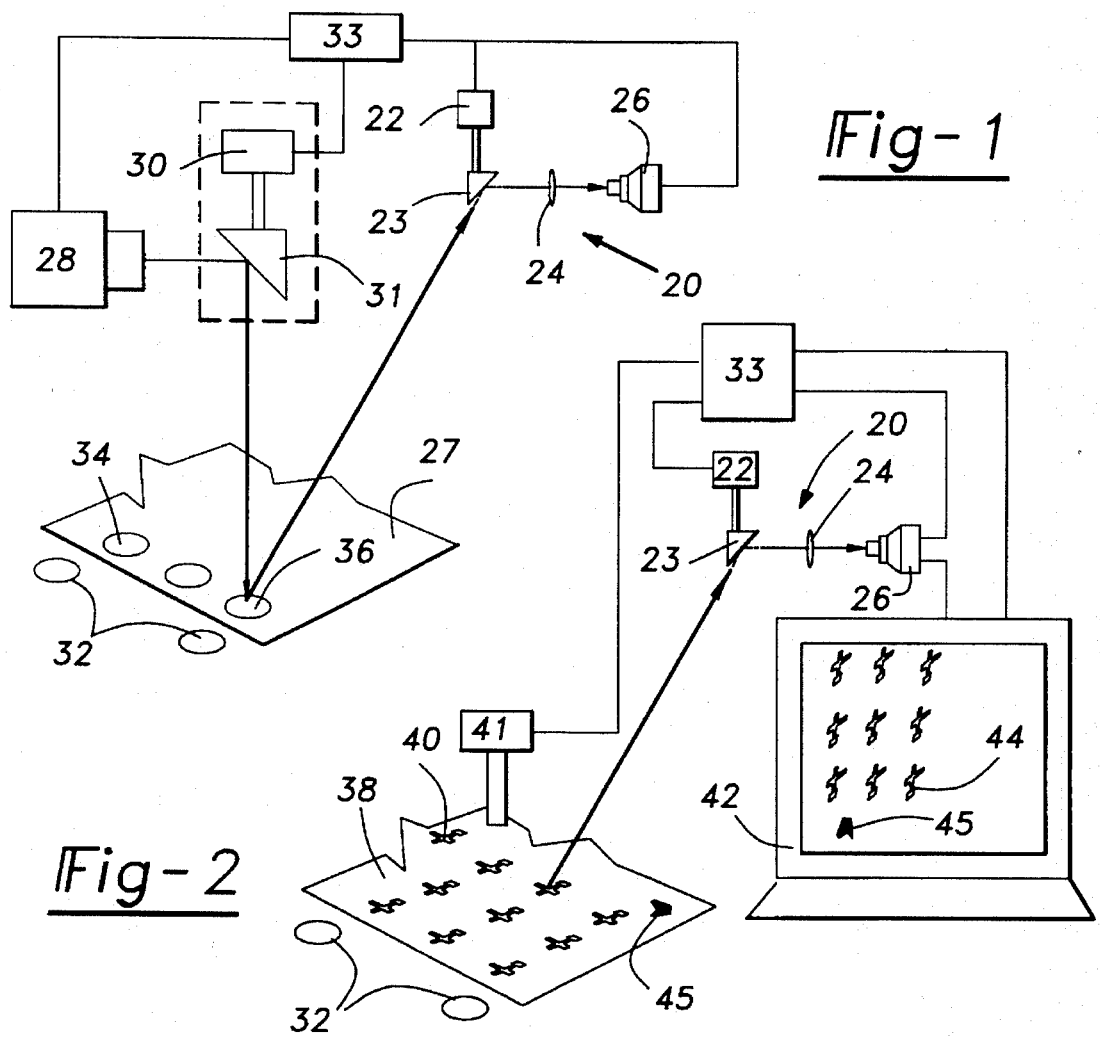
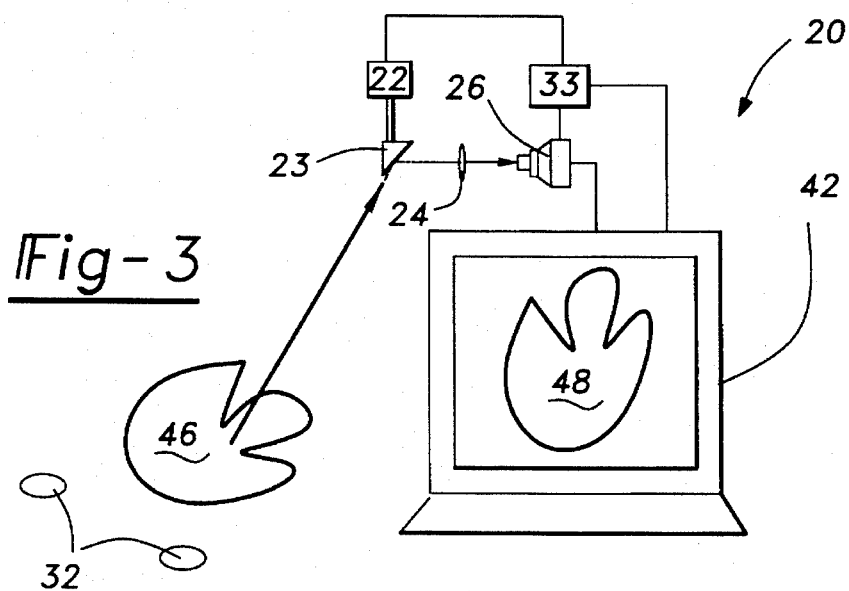

GALVANOMETER AND CAMERA SYSTEM

BACKGROUND OF THE INVENTION

This application relates to a combined galvanometer and camera for evaluating workpiece surfaces.

In the prior art, lasers are sometimes used to map the surface of a workpiece. In a typical application, a laser is used to perform a function such as storing the location of flaws in a piece of leather or textile material in a computer memory. An operator has typically moved the laser to define outlines of a flaw. A known nesting program then determines optimal locations to cut parts based upon the flaw locations. The laser may then be used to outline locations of parts to be cut in the leather or textile material based on the location of the flaws.

A camera would often be desirably associated with these systems to provide an image of the surface. As an example, a camera might be utilized to identify the location of flaws, whereas a laser has typically been moved manually to enter the location of the outline of the flaws into a storage. Moreover, the cameras would desirably be used to provide storage of the shape or location of features on the workpiece.

However, the prior art camera systems have not typically provided accurate resolution such that the camera can perform many of the tasks that would be desirable. As an example, a camera mounted above a workpiece is typically not able to accurately scan the surface of the workpiece to accurately determine the location of patterns, flaws or shapes on the workpiece. Moreover, the resolution of the camera image is typically not sufficient such that the camera may be utilized to store information about the workpiece in a computer memory.

The prior art has proposed incorporating a galvanometer into a camera system. These proposed systems have only been proposed to be utilized for studying the surface of a workpiece. The proposed systems have not been utilized in combination with controls that associate the image with a particular location on the workpiece as indicated by the galvanometer positions.

SUMMARY OF THE INVENTION

In a disclosed embodiment of this invention, a galvanometer system is mounted forwardly of an electronic camera, such as a CCD camera. The mirrors mounted on the galvanometer projects an image from a workpiece into the camera. By utilizing the galvanometer, small discrete sections of the workpiece are sequentially directed to the camera. The camera image is used to accurately determine the location of elements on the workpiece, and also store information relative to the quality or appearance of the workpiece. The galvanometer is used to provide an indication to an associated controller of the exact location on the workpiece that is being directed into the camera. Known electronic cameras can transmit and store images in a computer memory.

In one disclosed embodiment, a lens is positioned between the galvanometer and the camera. The lens magnifies the image to increase the quality of the image being directed from the galvanometer to the camera. Since the galvanometer moves relative to the surface, the camera may remain fixed. This further increases the quality of the image that is being stored in the camera.

In general, this invention could be summarized as the inclusion of a controller that associates the position on a workpiece with the image directed from the galvanometer to the camera. The controller determines the position on the workpiece by taking the known position of the galvanometer to identify the location on the workpiece from where the image has been taken. This association of the accurate location on the workpiece with the image in the camera provides valuable benefits in that images may now be stored within the electronic camera and associated section-by-section with locations on a workpiece.

In one disclosed method of utilizing the inventive galvanometer and camera system, a laser beam is directed at a reference point on a workpiece. Typically, mirrors mounted on galvanometers direct the laser beam from a projector. The galvanometer associated with the camera then scans the workpiece until it identifies the reflected laser. The reflected laser is then directed by the mirror in the camera galvanometer into the camera. The camera galvanometer position provides an indication of the location of the laser beam. By calculating the angle of the laser beam, and also the angle of the beam as received by the camera galvanometer, one can accurately identify the location of the point on the workpiece where the laser is being directed. This allows an accurate digitization of the location of the point. This is an important feature for procedures such as digitizing a location on a surface of a workpiece to check the quality of the workpiece. As one example, a threaded bore may have been formed in a workpiece a set distance from a reference point. By identifying the exact location of that threaded bore with the above-described method, one can accurately check the quality of the workpiece.

In a second method of utilizing the inventive galvanometer and camera system, the camera galvanometer is utilized to store an image of the location of flaws or patterns in a leather or textile workpiece. As an example, a textile workpiece is often formed with a pattern. If one is trying to store that pattern into a computer program, and then identify locations for cutting parts from that textile workpiece, one needs to digitize the location of the pattern. It may be that a particular cut part should be orientated in a certain way relative to the pattern. As an example, a pattern often has an aspect that should be orientated vertically upwardly, as a figure. In that instance, it is important for the system to recognize the location and orientation of the pattern before the system computer identifies the desired location for parts to be cut from the workpiece.

In one prior art system, a laser is utilized to display the location of parts to be cut from a piece of material. Such a prior art system is available from Virtek Vision of Waterloo, Ontario. With the inventive system, the location of a pattern on that material can be easily entered into the computer memory, and the system may incorporate the location of that pattern in its determination of where to cut parts from the workpiece. The camera can also be used to identify flaws in the workpiece.

Finally, in a third method of utilizing the inventive galvanometer and camera combination, the galvanometer is utilized to identify the surface structure on a workpiece. This information is directed to the camera which in turn creates a computer model of the workpiece. In this way, the galvanometer and camera combination can be utilized for storing and creating a computer-aided design file of the structure of a workpiece.

In preferred embodiments, a CCD camera is utilized as the camera. Further, although the application discloses only a single lens between the galvanometer and camera, it should be understood that lens systems utilizing plural lenses may also be utilized.

In the above-described embodiments, it is typically required that the system be able to accurately identify the location of the galvanometer and camera, and also the laser. Known methods of identifying the actual locations such as placing reference points on a table which holds the workpiece may be utilized.

These and other features of the present invention can be best understood from the following specification and drawings, the following of which is a brief description.

BRIEF DESCRIPTION OF THE DRAWINGS

FIG. 1 shows a first method utilizing the present invention.

FIG. 2 shows a second method utilizing the present invention.

FIG. 3 shows a third method utilizing the present invention.

DETAILED DESCRIPTION OF THE PREFERRED EMBODIMENTS

FIG. 1 shows a first system 20 incorporating a galvanometer system 22 having mirrors 23 for directing an image through a lens 24 into a camera 26. The galvanometer system 22 is shown schematically. The illustration is simplified to facilitate an easy understanding of the inventive aspects of this invention. As is known, a galvanometer system typically include several galvanometers and mirrors which are controlled by a computer to move the mirrors 23 to change the location of a surface on a workpiece 27 that is aligned with the mirrors. To date, such known galvanometer systems have been generally used to project laser beams at locations on a workpiece. Controls for the camera galvanometer 22 such as were used to move lasers can be used similarly to change the location that will be seen in the camera mirrors 23. Stated another way, in the prior art, galvanometers have been typically utilized to change the location on a workpiece where a laser beam will be directed. In this invention, however, the galvanometer is used in a reverse fashion. The inventive galvanometer system changes the location of mirror 23 to change the image from workpiece 27 that is directed through lens 24 and to camera 26. The necessary controls, however, are essentially the same.

In the method shown in FIG. 1, a laser 28 directs a beam off of a galvanometer system 30 (shown schematically) moving mirrors 31. The location of the laser 28 and camera 26, and their respective galvanometers, is accurately known relative to the workpiece. In this embodiment, reference location points 32 are mounted on a table which supports workpiece 27. The location of the galvanometer 28 and camera 26 is initially identified relative to the known location of the points 32. Although only two points 32 are shown, a minimum of four is required. Once the accurate location of the camera 26 and the laser 28 and their associated galvanometers is known, the laser then directs a beam off locations on the workpiece. As an example, location 34 on workpiece 27 may be a reference location. Location 36 could be an element that has been machined into the workpiece, such as a threaded bore. The location of element 36 relative to known reference location 34 can be accurately tested by the system shown in FIG. 1.

Laser 28 and its galvanometer system 30 directs the laser beam at location 36. The galvanometer system 22 then rotates mirrors 23 until the reflective laser beam is identified. The control 33 for the system will sense when the laser has been detected by the camera, and then stop further movement of the mirrors 23. At that point, the relative orientations of the galvanometer systems 30 and 22 are checked. By knowing the orientation of the two galvanometer systems, control 33 can accurately calculate the rays between the two galvanometer systems and the point 36. This in turn allows control 33 to accurately calculate the location of the point 36. That location can be compared with an expected location relative to point 34 and determine whether workpiece 27 has been accurately formed.

The use of the galvanometer system 22 in combination with the camera 26 allows the system to quickly and accurately calculate the location of elements such as element 36. The use of the lens 24 magnifies the image directed by mirrors 23 to camera 26 such that sufficient resolution is obtained for the camera to perform its function.

FIG. 2 shows a second use for the basic system 20. In FIG. 2, the laser beam is not directed into the camera. In the illustrated method, the workpiece 38 may be a portion of fabric or leather having a pattern. The system may be utilized in combination with a laser 41 which is to display the location of pans to be cut from the fabric 38. As discussed above, systems are known wherein flaws in fabric 38 which should be omitted from cut parts are located. A computer then utilizes a known nesting subroutine to identify the optimal location for parts to be cut from the workpiece. A laser displays those locations, and a worker then sets up cutting tools.

The prior art has not successfully incorporated the location of a pattern into such a system. It would be desirable to identify the location of a pattern on the workpiece 38 such that when the controller, here shown schematically at 33, begins to determine the optimal location of parts to be cut on the workpiece 38, the location of the pattern will have been incorporated into the desired location of the cut pans. As an example, if the pattern included figures that have a defined vertically upper orientation, it would be necessary that the location of a part which is to include those figures be able to recognize which portion of the pattern must be orientated vertically upwardly in the cut part.

The inventive galvanometer and camera system 20 allows the storage of the pattern 40 into a computer 42. The galvanometer system 22 moves mirrors 23 about the workpiece 38. Each incremental position directs an image through lens 24 to camera 26. The incremental positions serially cover the workpiece section by section. The size of each section is controlled by the size of the mirrors, the distance from the mirrors, and the optical characteristics of the lens. Known programs may then be used to store the pattern as shown at 44 in a computer 42. The pattern can then be incorporated into a program which identifies the optimal location for parts to be cut in the workpiece 38. Again, control 33 communicates between galvanometer 22, camera 26, computer 42, and laser 41. By utilizing the galvanometer 22 system with the camera 26, one is able to serially enter the location of the pattern 40 with a sufficient degree of resolution such that the stored material 44 is sufficient for the computer to identify the location of the pattern. The same method may be used to store other surface information about a workpiece, such as a flaw, shown at 45. Previously, flaws were manually identified.

Another method for utilizing the inventive galvanometer and camera system 20 is illustrated in FIG. 3. In FIG. 3, a workpiece 46 is being mapped by the system 20 to store the surface structure of the workpiece in a computer-aided design file. It is sometimes desirable to identify a workpiece, and store its structure in a computer-aided design program such that further modification or calculations may be performed relative to the workpiece surface. Again, the galvanometer system 22 operates mirrors 23 to serially identify and direct images from the workpiece 46 to camera 26. This allows the computer 42 to serially store the structure 48 of the workpiece. Control 33 also communicates between the system components. This method may be most preferably utilized to provide an outline of the workpiece.

The use of the galvanometer system allows the camera to serially store discrete bits of information from the workpiece. In the prior art, cameras have typically had insufficient resolution to scan a workpiece. However, the use of the galvanometer with the associated lens provides sufficient resolution such that the combined galvanometer and camera is practical for performing the above-described methods, and other methods.

The computer programs that are utilized for determining the location of the point 36 in the FIG. 1 method, storing the information from the camera 26 in the FIGS. 2 and 3 methods, and also determining the optimal location for parts to be nested from the stored information on the workpiece as shown in the FIG. 2 method are all known within the art. A worker of ordinary skill in the art would recognize how to store the information and evaluate the information to perform the methods of FIG. 1–3. Additionally, although the control 33 and computer 42 are shown as separate elements, the computer can also act as the control.

The main features of this invention could be summarized as the inclusion of a galvanometer and a camera, along with a control that associates the position of the galvanometer with the image directed to the camera. In this way, many beneficial methods of storing and utilizing the images directed from the workpiece to the camera may now be achieved.

Although preferred embodiments of this invention have been disclosed, a worker of ordinary skill in the art would recognize that certain modifications come within the scope of this invention. For that reason, the following claims should be studied to determine the true scope and content of this invention.

We claim:

1. A combined galvanometer and camera combination comprising:

a galvanometer motor driving a mirror, said mirror being positioned such that it can receive an image from an associated workpiece and direct that image into the lens of a camera;

a camera associated with said mirror and positioned such that an image directed from said mirror enters a lens of said camera; and a controller for associating the position of the galvanometer with the image directed into the camera.

2. A combination as recited in claim 1, wherein a magnifying lens is positioned between said mirror and said camera to magnify the image being directed by said mirror to said camera.

3. A system as recited in claim 1, where said camera feeds information to a computer storage member such that the images directed by said mirror to said camera are stored in said computer memory and associated with specific locations on the workpiece.

4. A method of identifying information relative to a workpiece comprising the steps of:

(1) providing a galvanometer for driving a mirror adjacent a workpiece;

(2) providing a camera at a location such that said mirror directs an image from the workpiece into a lens of said camera; and (3) rotating said mirror to change the image being directed from said mirror into said camera, and storing the image directed at said camera and associating the stored image with the location on the workpiece.

5. A method as recited in claim 4, wherein a lens is provided between said mirror and said camera, and said lens modifying the image directed by said mirror to said camera.

6. A method as recited in claim 4, wherein a laser is also provided adjacent to said workpiece, said laser directing a beam at a location on said workpiece, said galvanometer rotating said mirror until said mirror directs said beam into the lens of said camera.

7. A method as recited in claim 6, wherein the relative orientations of said laser beam and a reflected image from the laser beam are studied to determine the exact location of the point that said laser beam is contacting on said workpiece.

8. A method as recited in claim 4, wherein said workpiece includes a pattern, and said mirror is rotated to store said pattern in a computer memory.

9. A method as recited in claim 8, wherein a computer stores the pattern, and the pattern is then incorporated into a method for determining an optimal location for cutting parts from said workpiece.

10. A method as recited in claim 4, wherein said galvanometer is used to serially direct images from a workpiece into said camera to provide a computer mapping of said workpiece.

11. A method as recited in claim 10, wherein said camera stores the information relative to the workpiece in a computer memory.

12. A method as recited in claim 4, wherein said camera is a CCD camera.

13. A method as recited in claim 4, wherein an initial step of initially identifying the location of said motor is performed before performing step (3).

14. A method of identifying the location of an element on a workpiece comprising the steps of:

(1) providing a laser adjacent to a workpiece;

(2) providing a galvanometer adjacent to a workpiece, and having a mirror;

(3) providing a camera at a location such that said mirror directs an image from said workpiece to the lens of said camera;

(4) directing a laser beam from said laser at a point on said workpiece;

(5) rotating said mirror of said galvanometer until the laser beam is reflected from said workpiece into the lens of said camera; and (6) evaluating the rays from the laser beam to the point on said workpiece and from the point on said workpiece to the galvanometer, to determine the exact location of said point.

15. A method as recited in claim 14, wherein the method includes the step of initially identifying the location of said laser and said camera relative to the workpiece prior to beginning step 4.

16. A method of storing information relative to a workpiece comprising the steps of:

(1) providing a galvanometer and a mirror adjacent to a workpiece;

(2) providing a camera at a location such that the mirror of said galvanometer directs an image from the workpiece into the lens of said camera;

(3) providing a computer associated with said camera such that information from said camera is directed into said computer for storage;

(4) rotating said galvanometer driven mirror about the surface of a workpiece to serially direct information from said workpiece into the lens of said camera; and (5) storing said information in said computer and associating said stored information with a location on said workpiece.

17. A method as recited in claim 16, wherein said workpiece is formed with a pattern, and said pattern is stored in said computer.

18. A method as recited in claim 16, wherein said workpiece is formed of a particular shape, and the storage of the information relative to said workpiece is stored in a computer aided design file for said workpiece.

19. A method as recited in claim 16, wherein a lens is positioned between said galvanometer mirror and said camera.

* * * * *